US012309574B2

(12) United States Patent
Malot

(10) Patent No.: US 12,309,574 B2
(45) Date of Patent: May 20, 2025

(54) SPATIAL AUDIO ADJUSTMENT FOR AN AUDIO DEVICE

(71) Applicant: QUALCOMM Incorporated, San Diego, CA (US)

(72) Inventor: Ashish Kumar Malot, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/931,156

(22) Filed: Sep. 12, 2022

(65) Prior Publication Data

US 2024/0089687 A1 Mar. 14, 2024

(51) Int. Cl.
*H04S 7/00* (2006.01)

(52) U.S. Cl.
CPC .................................... *H04S 7/303* (2013.01)

(58) Field of Classification Search
CPC ....................................................... H04S 7/303
USPC ............................ 381/1, 2, 56, 58, 124, 303
See application file for complete search history.

(56) References Cited

U.S. PATENT DOCUMENTS

2017/0289209 A1* 10/2017 Osman .................. G10L 19/008
2020/0236489 A1* 7/2020 Merimaa ................ H04R 5/033
2023/0341928 A1* 10/2023 Traynor .................. G06F 3/013

FOREIGN PATENT DOCUMENTS

WO WO-2017176375 A1 10/2017
WO WO-2019067445 A1 4/2019

OTHER PUBLICATIONS

International Search Report and Written Opinion—PCT/US2023/071931—ISA/EPO—Dec. 6, 2023.

* cited by examiner

*Primary Examiner* — William A Jerez Lora
(74) *Attorney, Agent, or Firm* — QUALCOMM Incorporated; Espartaco Diaz Hidalgo

(57) ABSTRACT

In some aspects, an audio device may measure a first head position of a user of the audio device. The audio device may transmit, to a device, an indication of the first head position or a second head position of the user, wherein the second head position is based at least in part on the first head position, and wherein the second head position is a head position of the user at a time when spatial audio is to be output by the audio device. The audio device may receive, from the device, spatial audio data that is based on the first head position or the second head position. The audio device may process the spatial audio data to obtain the spatial audio, wherein the spatial audio is based on the second head position. The audio device may output the spatial audio. Numerous other aspects are described.

13 Claims, 5 Drawing Sheets

SPATIAL AUDIO ADJUSTMENT FOR AN AUDIO DEVICE

FIELD OF THE DISCLOSURE

Aspects of the present disclosure generally relate to audio devices and, for example, to spatial audio adjustments for an audio device.

BACKGROUND

Spatial audio is a three-dimensional (3D) audio processing technique to manipulate sound output by an audio device. Spatial audio is the technique whereby sounds are processed to make the sounds appear to a listener to come from a real location in a 3D space when in fact the sounds emanate from two or more speakers. For example, using head-related transfer functions or reverberation, the changes of sound from the source (including reflections from walls, floors, and/or other objects) to a listener's ear can be simulated. These effects may include the simulation of sound sources behind, above and/or below the listener. For example, spatial audio (sometimes referred to as 3D audio processing) may process or render audio output by an audio device to mimic natural sound waves, which emanate from a point in a 3D space (e.g., even though the audio may be output via just two speakers of the audio device). For example, spatial audio processing may generate audio containing audio cues that enable the listener to "localize" a sound within a 3D space. Audio cues, such as interaural time and level difference, suggest the user is in an actual 3D environment, thereby contributing strongly to a sense of immersion.

SUMMARY

In some aspects, an audio device includes two or more speakers that are configured to output spatial audio; one or more sensors; a memory; and one or more processors, coupled to the memory, configured to cause the audio device to: measure, via the one or more sensors, a first head position of a user of the audio device; transmit, to a device, an indication of the first head position or a second head position of the user, wherein the second head position is based at least in part on the first head position, and wherein the second head position is a head position of the user at a time when the spatial audio is to be output by the two or more speakers; receive, from the device, spatial audio data that is based on the first head position or the second head position; process the spatial audio data to obtain the spatial audio, wherein the spatial audio is based at least in part on the second head position; and output, via the two or more speakers, the spatial audio.

In some aspects, a method performed by an audio device includes measuring a first head position of a user of the audio device; transmitting, to a device, an indication of the first head position or a second head position of the user, wherein the second head position is based at least in part on the first head position, and wherein the second head position is a head position of the user at a time when spatial audio is to be output by the audio device; receiving, from the device, spatial audio data that is based on the first head position or the second head position; processing the spatial audio data to obtain the spatial audio, wherein the spatial audio is based at least in part on the second head position; and outputting the spatial audio.

In some aspects, a non-transitory computer-readable medium storing a set of instructions includes one or more instructions that, when executed by one or more processors of an audio device, cause the audio device to: measure a first head position of a user of the audio device; transmit, to a device, an indication of the first head position or a second head position of the user, wherein the second head position is based at least in part on the first head position, and wherein the second head position is a head position of the user at a time when spatial audio is to be output by the audio device; receive, from the device, spatial audio data that is based on the first head position or the second head position; process the spatial audio data to obtain the spatial audio, wherein the spatial audio is based at least in part on the second head position; and output the spatial audio.

In some aspects, an apparatus may include means for measuring a first head position of a user of the apparatus. The apparatus may include means for transmitting, to a device, an indication of the first head position or a second head position of the user, where the second head position is based at least in part on the first head position, and where the second head position is a head position of the user at a time when spatial audio is to be output by the apparatus. The apparatus may include means for receiving, from the device, spatial audio data that is based on the first head position or the second head position. The apparatus may include means for processing the spatial audio data to obtain the spatial audio, where the spatial audio is based at least in part on the second head position. The apparatus may include means for outputting the spatial audio.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
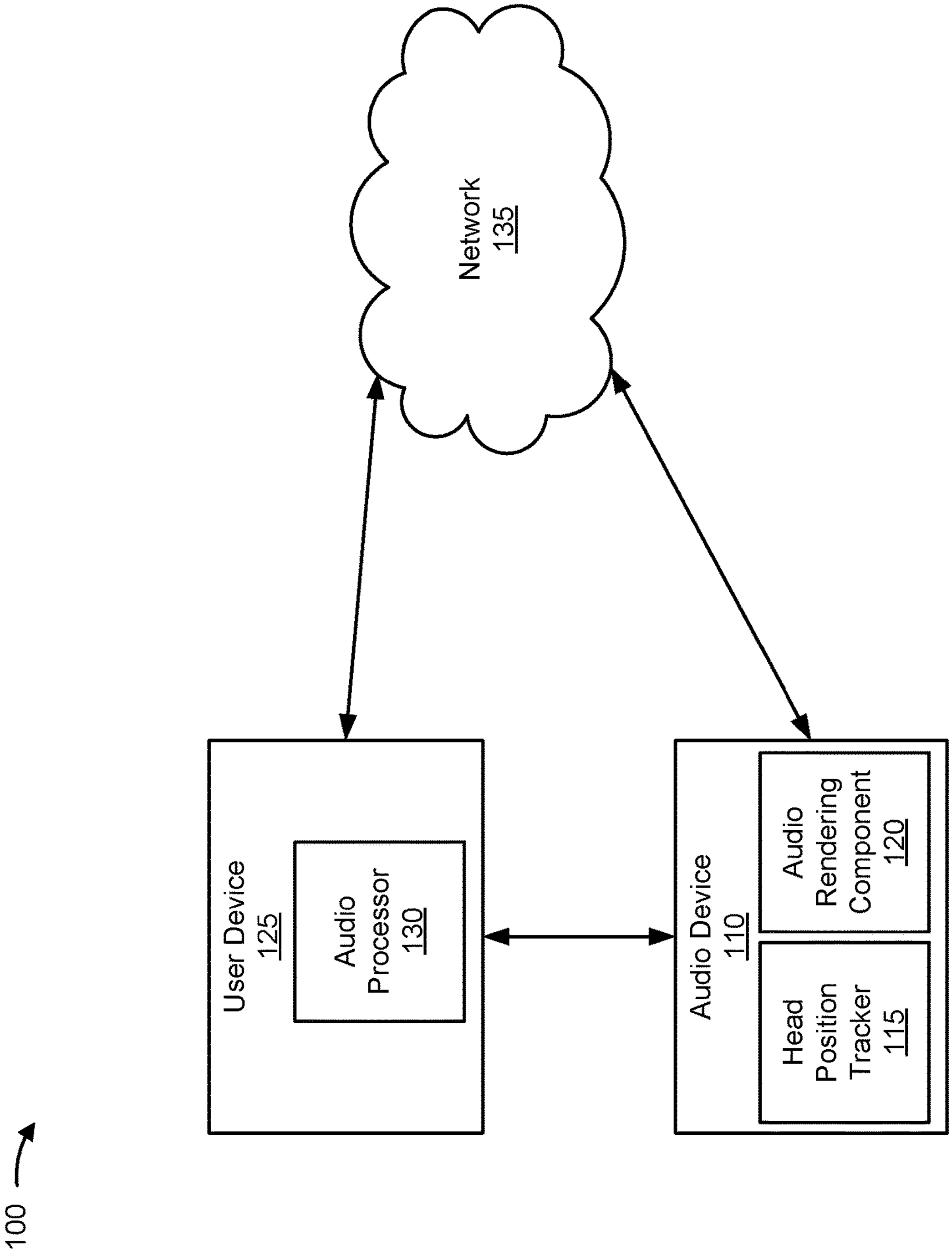
FIG. 1 is a diagram illustrating an example environment in which spatial audio adjustments for an audio device described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A listener may be able to perceive the direction and distance of a source of sound. Two cues are primarily used in the human auditory system to achieve this perception. These cues are generally referred to as the inter-aural time difference (ITD) and the inter-aural level difference (ILD), which result from the distance between a location of ears of the listener and a shadowing caused by a head of the listener. In addition to the ITD and ILD cues, a head-related transfer function (HRTF) may be used to localize the sound-source in three-dimensional (3D) space. The HRTF may also be referred to as an anatomical transfer function (ATF). The HRTF may be the frequency response from a sound-source to each ear, which can be affected by diffractions and reflections of the sound waves as they propagate in space and pass around the listener's torso, shoulders, head, and/or pinna. Therefore, the HRTF for a sound-source generally differs from person to person.

For example, the HRTF may be a response that characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies and attenuating other frequencies. A pair of HRTFs for two ears can be used to synthesize a spatial audio (e.g., binaural audio) that appears (e.g., to the lister) to come from a particular point in a 3D space. Audio processing may include HRTF processing to generate spatial audio that is output via two or more speakers of an audio device to mimic natural sound waves, which emanate from a point in a 3D space (e.g., even though the spatial audio may be output via the two or more speakers of the audio device).

In some cases, an audio device may be associated with another device that performs audio processing for the audio device. For example, the other device may be a user device, a mobile device, and/or a companion device, among other examples. For example, an audio device may measure a head position of a user. For example, the audio device may use one or more sensors and/or cameras to measure the head position of the user (e.g., as described in more detail elsewhere herein). The audio device may use the measurements to determine a head pose of the user (e.g., at a first time). The audio device may transmit, to the other device, head pose data indicating the head pose of the user (e.g., at the first time). The other device may use the head pose data, a current orientation of the audio device, and/or other factors to process multi-channel audio data to obtain spatial audio data for the head pose of the user. For example, the other device may use HRTF processing to generate spatial audio data to simulate audio coming from a given point in a 3D space for the current head pose of the user and/or the current orientation of the audio device. The other device may transmit, and the audio device may receive, the spatial audio data. The audio device may process (e.g., render) the spatial audio data. The audio device may output, via the two or more speakers of the audio device, the spatial audio. Spatial audio that is processed to be output via two channels (e.g., via two speakers) may be referred to as binaural audio.

However, this process may be associated with delays or latency that degrade the spatial audio that is output by the audio device. For example, the audio device may communicate with the other device via a wireless or wired connection. These communications may be associated with a communication delay associated with an amount of time from a time at which a transmitting device (e.g., the audio device or the other device) transmits a communication to a time at which a receiving device (e.g., the other device or the audio device) receives the communication. For example, the transmission of the head pose data from the audio device to the other device may be associated with a first communication delay. The transmission of the processed spatial audio data from the other device to the audio device may be associated with a second communication delay. Additionally, or alternatively, there may be a processing delay associated with determining the head pose data (e.g., by the audio device) and/or with processing the multi-channel audio data to obtain spatial audio data for the head pose of the user (e.g., by the other device). The head of the user may change between a time at which the head position is measured by the audio device (e.g., $T_1$) and a time at which the spatial audio is output by the audio device (e.g., $T_2$, where $T_2=T_1$+the delay(s) described above). Such delays may be as long as 300 milliseconds, or more. Therefore, because the head pose for which the spatial audio is processed (e.g., the head pose at $T_1$) may be different than an actual hose pose of the user at the time that the spatial audio is output by the audio device (e.g., the head pose at $T_2$), the spatial audio may be inaccurate for the actual hose pose of the user, degrading the accuracy of the spatial audio and degrading a user experience.

Some implementations described herein enable spatial audio adjustments for an audio device. For example, spatial audio may be processed and/or rendered (e.g., by an audio device and/or a user device) using a head position of a user at a time that the spatial audio is to be output by the audio device (e.g., rather than at a time at which the head position is originally measured before communication delays and/or processing delays). For example, the audio device may measure a first head position of a user of the audio device. The audio device may transmit (e.g., to a user device) an indication of the first head position or a second head position of the user. In some aspects the second head position may be based at least in part on the first head position and/or may be a head position of the user at a time when the spatial audio is to be output by the audio device. For example, the second head position may be a predicted head position (e.g., predicted by the audio device using historical head position measurements of the user and an average delay associated with processing the spatial audio). The audio device may receive spatial audio data that is based on the first head position (e.g., if the first head position is transmitted by the audio device) or the second head position (e.g., if the second head position is transmitted by the audio device). The audio device may process the spatial audio data to obtain the spatial audio.

The spatial audio may be based at least in part on the second head position. For example, the user device may process or spatialize the spatial audio data using the second head position (e.g., a predicted head position) and provide the spatial audio data that is processed using the second head position. As another example, the user device may process or spatialize the spatial audio data using the first head position. The audio device may process the spatial audio data, that is based at least in part on the first head position, to obtain the spatial audio that is based at least in part on the second head position. In other words, the audio device may perform audio post-processing of the spatial audio data received from the user device to obtain spatial audio for a latest head position of the user. The audio device may output the spatial audio (e.g., via two or more speakers).

As a result, a delay (e.g., a communication delay and/or a processing delay) associated with processing spatial audio may be accounted for. For example, by using a predicted head position of a user (e.g., at a time at which the spatial audio is to be output) and/or by performing post-processing of spatial audio data based at least in part on a latest head position of the user (e.g., after the spatial audio data has been spatialized using a previous head position of the user), the audio device may be enabled to output spatial audio that with improved accuracy to a current head position of the user. This may improve an accuracy of the spatial audio and/or improve a user experience because the spatial audio may appear to a listener to be coming from a position in a 3D space that is closer to an intended source location in the 3D space.

FIG. 1 is a diagram illustrating an example environment 100 in which spatial audio adjustments for an audio device described herein may be implemented, in accordance with the present disclosure. As shown in FIG. 1, environment 100 may include an audio device 110 (e.g., that include a head position tracker 115 and an audio rendering component 120), a user device 125 (e.g., that includes an audio processor 130), and a network 135. Devices of environment 100 may interconnect via wired connections, wireless connections, or a combination of wired and wireless connections.

The audio device 110 may include one or more devices capable of receiving, generating, storing, processing, and/or providing information associated with audio adjustments for the audio device 110, as described elsewhere herein. The audio device 110 may include a communication device and/or a computing device. In some aspects, the audio device may include one or more speakers that are configured to output sound (e.g., spatial audio). For example, the audio device 110 may include one or more devices configured to reproduce, record, and/or output sound. For example, the audio device 110 may include headphones, earphones, one or more speakers, a headset, a wireless communication device, a mobile phone, a user equipment, a laptop computer, a tablet computer, a desktop computer, a gaming console, a wearable communication device (e.g., a pair of smart eyeglasses, a head mounted display, or a virtual reality headset), a sound system (e.g., a surround-sound system), a stereo, and/or a similar type of device. In some aspects, the audio device 110 may include one or more sensors configured to measure and/or track a head position of a user (e.g., a user that is wearing the audio device 110 and/or listening to sound being output by the audio device 110). For example, the one or more sensors may include a gyroscope, an accelerometer, a magnetometer, one or more cameras, and/or an inertial measurement unit (IMU) sensor (e.g., a 3-axis IMU sensor, a 6-axis IMU sensor, and/or a 9-axis IMU sensor), among other examples.

The audio device 110 may include the head position tracker 115. The head position tracker 115 may include one or more components and/or one or more devices configured to measure and/or track a head position of a user (e.g., a user that is wearing the audio device 110 and/or listening to sound being output by the audio device 110). For example, the head position tracker 115 may include the one or more sensors (e.g., described above). Additionally, or alternatively, the head position tracker 115 may include one or more components configured to determine a head position of the user based on measurement data obtained via the one or sensors.

The audio device 110 may include the audio rendering component 120. The audio rendering component 120 may include one or more components and/or one or more devices configured to process audio data (e.g., spatial audio data) to be output by the audio device 110 (e.g., via the one or more speakers of the audio device 110). For example, the audio rendering component 120 may be configured to obtain audio data to be output via a given speaker of the audio device 110 from multiple audio channels associated with spatial audio data.

The user device 125 may include one or more devices capable of receiving, transmitting, generating, storing, processing, and/or providing information associated with audio adjustments for the audio device 110, as described elsewhere herein. The user device 125 may include a communication device and/or a computing device. For example, the user device 125 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The user device 125 may include the audio processor 130. The audio processor 130 may include one or more components and/or one or more devices configured to process audio data to generate spatial audio that is based on a head position of a user. For example, the audio processor 130 may be configured to output spatial audio data that is based on inputs of multiple channel audio, a head position of a user, and/or an orientation of the audio device 110, among other examples.

The network 135 may include one or more wired and/or wireless networks. For example, the network 135 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 135 enables communication among the devices of environment 100.

The quantity and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
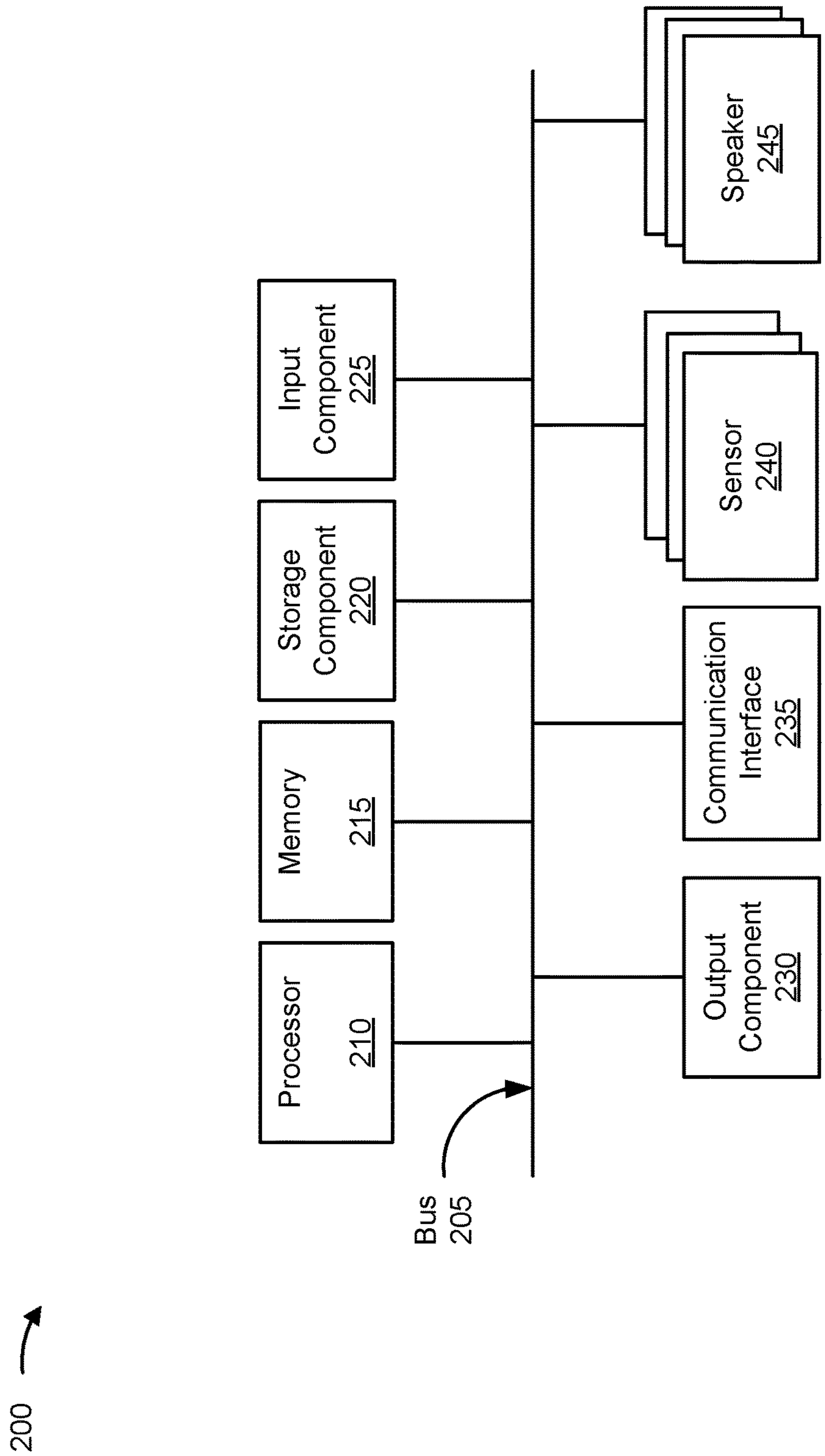
FIG. 2 is a diagram illustrating example components of a device, in accordance with the present disclosure.

FIG. 2 is a diagram illustrating example components of a device 200, in accordance with the present disclosure. Device 200 may correspond to the audio device 110, the head position tracker 115, the audio rendering component 120, the user device 125, and/or the audio processor 130. In some aspects, the audio device 110, the head position tracker 115, the audio rendering component 120, the user device 125, and/or the audio processor 130 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240, and/or one or more speakers 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

A sensor 240 may be configured to measure and/or track a head position of a user (e.g., a user that is wearing the audio device 110 and/or listening to sound being output by the audio device 110). For example, the a sensor 240 may include a location sensor, a position sensor, a gyroscope, an accelerometer, a magnetometer, one or more cameras, and/or an inertial measurement unit (IMU) sensor (e.g., a 3-axis IMU sensor, a 6-axis IMU sensor, and/or a 9-axis IMU sensor), among other examples. A speaker 245 may include one or more components configured to output sound. For example, a speaker 245 may include an audio speaker, a loudspeaker, a woofer, a tweeter, a midrange speaker, a sound bar, a smart speaker, and/or a driver, among other examples.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for measuring a first head position of a user of an audio device; means for transmitting an indication of the first head position or a second head position of the user; means for receiving spatial audio data that is based on the first head position or the second head position; means for processing the spatial audio data to obtain the spatial audio; and/or means for outputting the spatial audio; among other examples. In some aspects, such means may include one or more components of device 200 described in connection with FIG. 2, such as bus 205, processor 210, memory 215, storage component 220, input component 225, output component 230, communication interface 235, sensor(s) 240, and/or speaker(s) 245.

The quantity and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
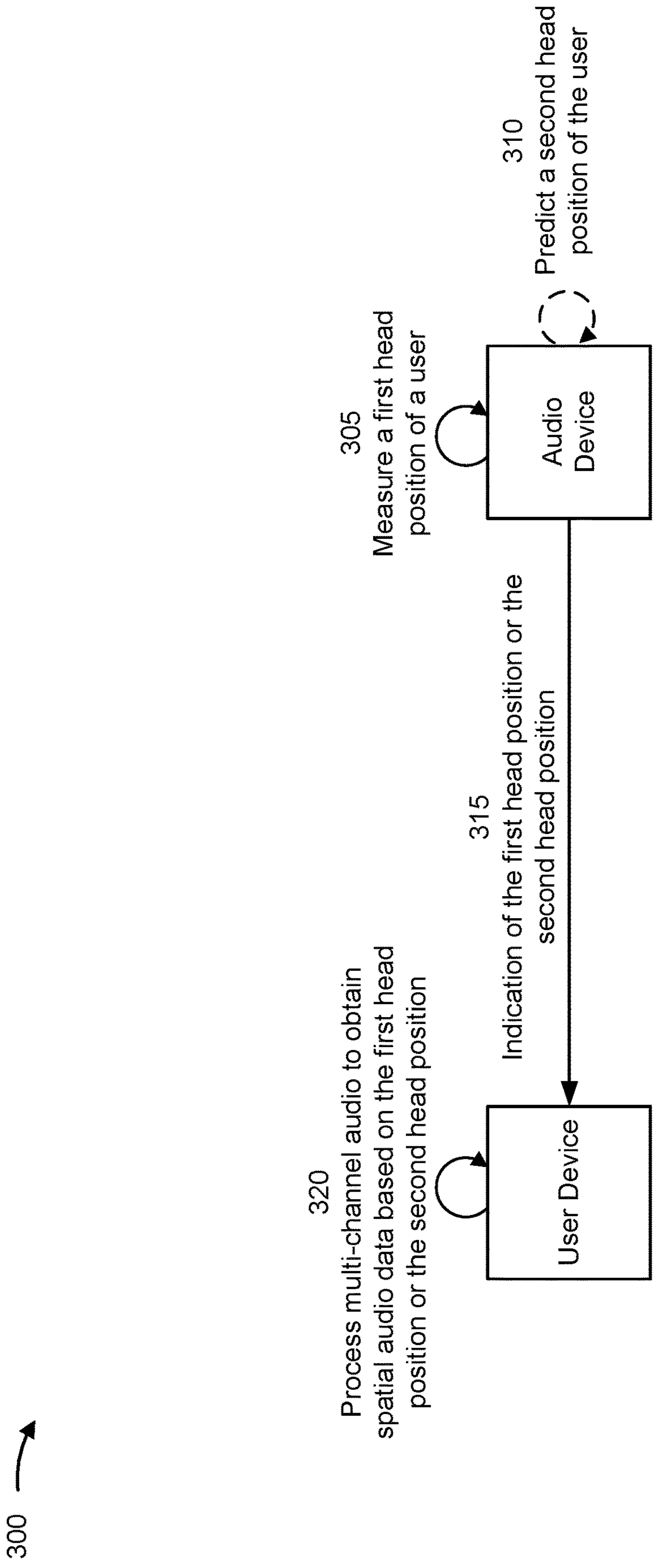
FIGS. 3A and 3B are diagrams illustrating an example associated with spatial audio adjustments for an audio device, in accordance with the present disclosure.
Figure 3B:
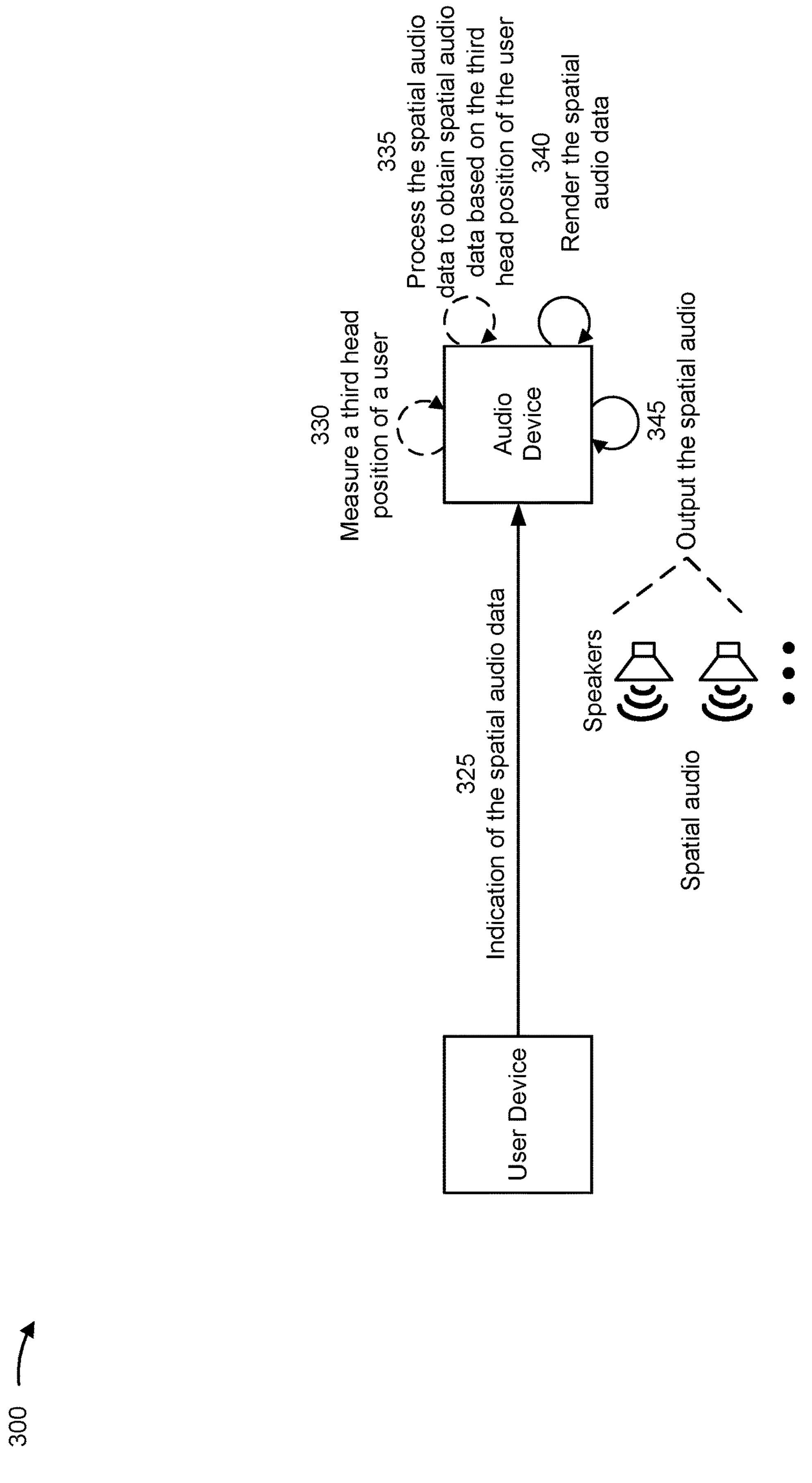

FIGS. 3A and 3B are diagrams illustrating an example 300 associated with spatial audio adjustments for an audio device, in accordance with the present disclosure. As shown in FIGS. 3A-3B, example 300 includes communication between a user device and an audio device. In some aspects, the user device and the audio device may communicate via a wireless connection and/or a wired connection. In some aspects, the user device and the audio device may be included in a single device (e.g., and the communications may be internal to the device). For example, the audio device may be configured to output sound for the user device. In other aspects, the user device and the audio device may be separate devices.

As shown in FIG. 3A, and by reference number 305, the audio device may measure a first head position of a user of the audio device. For example, the audio device may measure the first head position at a first time. In some aspects, the audio device may measure the first head position via one or more sensors associated with the audio device. For example, the audio device may determine the first head position using a head tracking technique. In some aspects, the audio device may use a head position tracker (e.g., the head position tracker 115) to measure and/or determine the first head position.

In some aspects, the audio device may measure and/or determine the first head position based on positional data captured by the one or more sensors. Additionally, or alternatively, the audio device may measure and/or determine the first head position based on one or more images captured by one or more cameras associated with the audio device. For example, the one or more sensors may capture data indicating a position of the head of the user (e.g., a head pose) at the first time.

In some aspects, the audio device may use an IMU to track and/or determine the first head position. For example, an IMU may be an electronic device that measures and reports a specific force, angular rate, and/or orientation of an object (e.g., the unit), using data from a combination of sensors (such as an accelerometer, a gyroscope, and/or a magnetometer, among other examples). For example, an IMU sensor may work by detecting a linear acceleration using one or more accelerometers and a rotational rate using one or more gyroscopes. Some IMU sensors include a magnetometer which may be used as a heading reference. Some IMU sensor configurations may include one accelerometer, gyroscope, and magnetometer per axis for each of the three principal axes: pitch, roll and yaw. For example, the audio device may use raw measurements (e.g., sensor data) to calculate an attitude (e.g., pitch angle or an attitude angle), angular rate, linear velocity, and/or position of the head of the user relative to a global reference frame (e.g., a reference point). The data from the one or more sensors may be combined to determine the first head position.

Additionally, or alternatively, the audio device (or another device) may capture one or more images. For example, the one or more images may be images of the user (e.g., of the head of the user) and/or may be images of surroundings of the user. The audio device may process the one or more images to determine the first head position. For example, the audio device may use an image analysis technique (e.g., a computer vision technique or another technique) to determine the first head position in one or more images of the head of the user and/or may compare images of surroundings of the user to a reference image.

The first head position may indicate a position using Euler angles (e.g., yaw, pitch, and roll) to define the orientation of the head in a 3D space. For example, the audio device may be calibrated with a reference point and/or a reference frame. The audio device may obtain sensor data and/or images (e.g., via the one or more sensors). The audio device may determine the first head position using the sensor data and/or images and the reference point and/or the reference frame. For example, the audio device may determine one or more angle values (e.g., a yaw angle value, a pitch angle value, and a roll angle value) to define the first head position with respect to the reference point and/or the reference frame.

In some aspects, as shown by reference number 310, the audio device may determine a second head position of the user. For example, the audio device may predict a second head position of the user (e.g., a head position of the user at a future time). For example, the second head position may be based at least in part on the first head position. The second head position may be a predicted head position of the user at a time when spatial audio is to be output by the audio device (e.g., by two or more speakers of the audio device). For example, the second head position may be a head position of the user at a second time. A difference between the first time and the second time may be based at least in part on communication delays and/or processing delays associated with outputting the spatial audio.

For example, the audio device and/or the user device may determine an average delay between a time at which the head position of the user is measured and/or determined (e.g., the first time) and a time at which spatial audio (e.g., that is based at least in part on the head position) is output by the audio device. The audio device and/or the user device may determine the average delay based at least in part on communication delay(s) between the audio device and the user device and/or processing delay(s) associated with processing and/or rendering the spatial audio. For example, the audio device and/or the user device may determine the average delay based at least in part on previous timing of spatial audio that is output by the audio device. The second time may be based at least in part on the average delay. For example, the second time may be the first time (e.g., at which the first head position is measured and/or determined by the audio device, as described above in connection with reference number 305) plus the average delay.

The audio device may predict a head position of the user at the second time. For example, the audio device may determine the predicted head position of the user (e.g., at the second time) based at least in part on the first head position and based at least in part on historical head position measurements. For example, head movements of the user may follow patterns and/or may be predictable. Therefore, the audio device may utilize historical head position measurements (e.g., performed and/or obtained by the audio device before the first time) to determine a future head position of the user (e.g., at the second time).

For example, the audio device may determine the predicted head position using a machine learning model or a prediction filter. For example, the machine learning model may include a neural network, a linear regression model, a logistic regression model, a decision tree, an analysis of variance model, a regularized regression model (e.g., Lasso regression, Ridge regression, or Elastic-Net regression), a random forest model, and/or another type of machine learning model that is trained to predict head positions or a head pose of a user. A prediction filter may include a linear prediction filter, a Kalman filter, and/or another type of prediction filter.

For example, the machine learning model and/or the predication filter may be trained using a set of observations. The set of observations may be obtained and/or input from training data (e.g., historical data), such as data gathered during one or more processes described herein. For example, the set of observations may include data gathered from previous samples of measurements of head positions of the user, as described elsewhere herein. In some aspects, the machine learning system may receive the set of observations (e.g., as input) from the audio device. Based at least in part on the historical data and/or the set of observations, the machine learning model and/or the predication filter may be trained to predict head positions or a head pose of the user.

The audio device may input the second time (e.g., the future for which the head position is to be predicted and/or the average delay, as described above), one or more historical head position measurements of the user, and/or an orientation (or position) of the audio device, among other examples, as inputs to the machine learning model and/or the predication filter. For example, the one or more historical head position measurements of the user may be measurement samples of the head position of the user taken slightly before (e.g., within a certain amount of time) from the first time (e.g., the time at which the head position of the user is measured and/or determined by the audio device, as described above in connection with reference number 305). The one or more historical head position measurements of the user may include the measurement of the first head position of the user at the first time. The machine learning model and/or the predication filter may output a predicted head position (e.g., using Euler angles (e.g., yaw, pitch, and roll) to define the orientation of the head) of the user at the second time.

As shown by reference number 315, the audio device may transmit, and the user device may receive, an indication of the first head position or the second head position of the user (e.g., the predicted head position of the user). For example, the user device may receive data (e.g., an indication of Euler angles (e.g., yaw, pitch, and roll)) indicating a head position of the user. The head position of the user may be the first head position (e.g., measured and/or determined by the audio device at the first time) or may be the second head position (e.g., predicted by the audio device based at least in part on the first head position). For example, in some aspects, the audio device may transmit, and the user device may receive, an indication of the predicted head position of the user at the second time. In other aspects, the audio device may transmit, and the user device may receive, an indication of the first head position.

As shown by reference number 320, the user device may process audio data (e.g., multi-channel audio data) to obtain spatial audio based at least in part on the head position indicated by the audio device (e.g., the first head position or the second head position). For example, the user device may spatialize the multi-channel audio data based at least in part on the head position indicated by the audio device. In some aspects, the spatial audio data generated by the user device may be associated with multiple channels. A quantity of the multiple channels may be based at least in part on a quantity of speakers associated with the audio device (e.g., a quantity of speakers that are to be used to output the spatial audio).

For example, if the head position indicated by the audio device is the first head position, then the spatial audio data may be based at least in part on the first head position. Alternatively, if the head position is the second head position (e.g., the predicted head position), then the spatial audio data may be based at least in part on the second (e.g., predicted) head position. In some aspects, the user device may use an audio spatializer to obtain the spatial audio data from multi-channel audio data.

For example, to spatialize the multi-channel audio data, the user device may modify a time delay between channels of the multi-channel audio data and/or may modify a frequency of the audio based at least in part on the head position indicated by the audio device (e.g., the time delay(s) and/or frequencies may be modified according to where the sound is supposed to have originated related to the head position). For example, a sound originating in a 3D space may arrive at a first ear of the user at a different time than the sound arrives at a second ear of the user. Therefore, to create this effect in the spatial audio, the user device may introduce time delays between various channels of the spatial audio to mimic the different times at which the sound would arrive at different ears of the user if the sound were to originate from a location in a 3D space (e.g., rather than from speaker(s) of the audio device).

Additionally, for a sound originating in a 3D space, different frequencies of the sound may be shifted differently for each direction that the sound could be coming from in the 3D space. The brain of the user may be capable of recognizing the changes in the frequency to identify a direction from which the sound is coming from. For example, higher frequencies of a sound coming from behind a user may be harder to hear because the higher frequencies may be muted by a pinna of an ear of the user (e.g., that the sound must pass through to reach the ear of the user). Therefore, to achieve this effect in the spatial audio, the user device may modify frequencies of the multi-channel audio data according to where the sound is supposed to appear to be originating (e.g., appear to be originating to the user listening to the spatial audio) relative to the head position of the user.

In some aspects, the user device may process the multi-channel audio data using a transfer function. For example, the transfer function may be a head-related transfer function (HRTF). The transfer function may be associated with one or more fast Fourier transforms and/or convolutions, among other examples, to modify the multi-channel audio data to obtain the spatial audio data based at least in part on the head position of the user. For example, the HRTF may enable the user device to modify the multi-channel audio data to generate the spatial audio data which results in spatial audio that appears (e.g., to the user) to originate from a point in a 3D space (e.g., rather than from the two or more speakers of the audio device).

As shown in FIG. 3B, and by reference number 325, the user device may transmit, and the audio device may receive, spatial audio data that is based on the head position indicated to the user device (e.g., the first head position or the second head position, as described above in connection with reference number 315). For example, the spatial audio data may be multi-channel audio data that is spatialized based at least in part on the indicated head position (e.g., head pose) of the user.

In some aspects, as shown by reference number 330, the audio device may measure and/or determine a third head position of the user (e.g., after receiving the spatial audio data). For example, after receiving the spatial audio data from the user device, the audio device may measure and/or determine the third head position of the user to determine a head position of the user closer in time to the time at which the spatial audio is to be output by the audio device. In some aspects, the audio device may measure the third head position via one or more sensors associated with the audio device. For example, the audio device may determine the third head position using a head tracking technique. In some aspects, the audio device may use a head position tracker (e.g., the head position tracker 115) to measure and/or determine the third head position.

In some aspects, the audio device may measure and/or determine the third head position based on positional data captured by the one or more sensors. Additionally, or alternatively, the audio device may measure and/or determine the third head position based on one or more images captured by one or more cameras associated with the audio device. For example, the one or more sensors may capture data indicating a position of the head of the user (e.g., a head pose). In some aspects, the audio device may use an IMU sensor to track and/or determine the third head position. The audio device may measure and/or determine the third head position in a similar manner as described in more detail elsewhere herein, such as in connection with reference number 305.

In some aspects, such as where the audio device transmitted an indication of the second (e.g., predicted) head position to the user device (e.g., as described above in connection with reference number 315), the audio device may determine whether the predicted head position (e.g., on which the spatial audio received from the user device is based) satisfies an accuracy threshold (e.g., based at least in part on the third head position). For example, the audio device may determine an error value associated with the predicted head position based at least in part on the third head position. The error value may be based at least in part on difference(s) between angle values (e.g., yaw, pitch, and/or roll angle values) of the predicted head position and the third head position.

In some aspects, the error value may be a largest value of the difference(s) between angle values (e.g., yaw, pitch, and/or roll angle values) of the predicted head position and the third head position. As another example, the error value may be a combination of the difference(s) between angle values of the predicted head position and the third head position. The audio device may determine whether the error value satisfies a threshold (e.g., the accuracy threshold). If the error value satisfies a threshold, then the audio device may perform processing on the received spatial audio data using the third head position. If the error value does not satisfy the threshold, then the audio device may use the received spatial audio data to output spatial audio via two or more speakers of the audio device. In other words, if the actual head position (e.g., the third head position) of the user and the predicted head position are close, then the audio device may not perform additional processing to modify the received spatial audio data. However, if the difference (e.g., error) between the actual head position (e.g., the third head position) of the user and the predicted head position is high, then the audio device may perform additional processing to modify the received spatial audio data based at least in part on the actual head position of the user.

In some aspects, as shown by reference number 335, the audio device may process the spatial audio data (e.g., that is received from the user device). For example, the audio device may process the spatial audio data based at least in part on transmitting the first head position to the user device (e.g., based at least in part on the spatial audio data being based at least in part on the first head position). As another example, the audio device may process the spatial audio data based at least in part on an error value of a predicted head position satisfying the accuracy threshold (e.g., as described above). For example, the audio device may process the spatial audio data (e.g., that is received from the user device) to modify the spatial audio data such that the spatial audio data is based at least in part on the third head position (e.g., rather than the first head position or the predicted head position).

For example, the audio device may process the spatial audio data, that is based at least in part on the first head position, to obtain the spatial audio that is based at least in part on the third head position (e.g., a measured head position that is determined after receiving the spatial audio data from the user device). For example, the audio device may process first spatial audio data (e.g., the spatial audio data that is received from the user device) to obtain second spatial audio data. The second spatial audio data may be based at least in part on the third head position.

For example, the audio device may apply a transfer function (e.g., a HRTF or another transfer function) to the received spatial audio data to obtain spatial audio data that is based at least in part on an actual head position (e.g., the third head position) of the user at, or close to, a time at which the spatial audio is to be output by the audio device. For example, the audio device may modify one or more time delays between channels of the spatial audio data to cause the spatial audio (e.g., when output by the audio device) to appear (e.g., to the user) to originate from a given point in a 3D space relative to the actual head position (e.g., the third head position) of the user at, or close to, a time at which the spatial audio is output by the audio device. Additionally, or alternatively, the audio device may modify frequencies the spatial audio data to cause the spatial audio (e.g., when output by the audio device) to appear (e.g., to the user) to originate from a given point in a 3D space relative to the actual head position (e.g., the third head position) of the user at, or close to, a time at which the spatial audio is output by the audio device. This may improve an accuracy of the spatial audio (e.g., may improve an effect of causing the user to perceive the audio as originating from a given point in a 3D space relative to the actual head position of the user) and/or may improve a user experience of the user by ensuring that the spatial audio is processed according to a head position of the user at, or close to, a time at which the spatial audio is to be output by the audio device.

As shown by reference number 340, the audio device may render the spatial audio data (e.g., that is received from the user device, as described in connection with reference number 325, or that is processed by the audio device, as described in connection with reference number 335). For example, the audio device may process the spatial audio data to obtain the spatial audio. For example, the audio device may determine information or data to be provided to two or more speakers of the audio device to cause the spatial audio to be output by the two or more speakers. For example, the audio device may process (e.g., render) the spatial audio data to obtain data for two or more channels (e.g., where a given channel is associated with a given speaker of the audio device). In some aspects, the audio device may render the spatial audio data (e.g., that includes multiple channels or multiple files) to obtain one or more signals to be provided to the speakers of the audio device.

As shown by reference number 345, the audio device may output the spatial audio. For example, as shown in FIG. 3B, the audio device may output the spatial audio via two or more speakers of the audio device. For example, the spatial audio may be associated with two or more channels. As described elsewhere herein, because the spatial audio is processed using a head position (e.g., the second (predicted) head position or the third head position) of the user at, or close to, a time at which the spatial audio is to be output by the audio device an accuracy of a point in a 3D space at which the spatial audio appears to originate from (e.g., to the user) may be improved.

For example, a delay (e.g., a communication delay and/or a processing delay) associated with processing spatial audio may be accounted for. For example, by using a predicted head position of a user (e.g., at a time at which the spatial audio is to be output) and/or by performing post-processing of spatial audio data based at least in part on a latest head position of the user (e.g., after the spatial audio data has been spatialized using a previous head position of the user), the audio device may be enabled to output spatial audio that with improved accuracy to a current head position of the user. This may improve an accuracy of the spatial audio and/or improve a user experience because the spatial audio may appear to a listener to be coming from a position in a 3D space that is closer to an intended source location in the 3D space As indicated above, FIG. 3A-3B is provided as an example. Other examples may differ from what is described with respect to FIG. 3A-3B.

Figure 4:
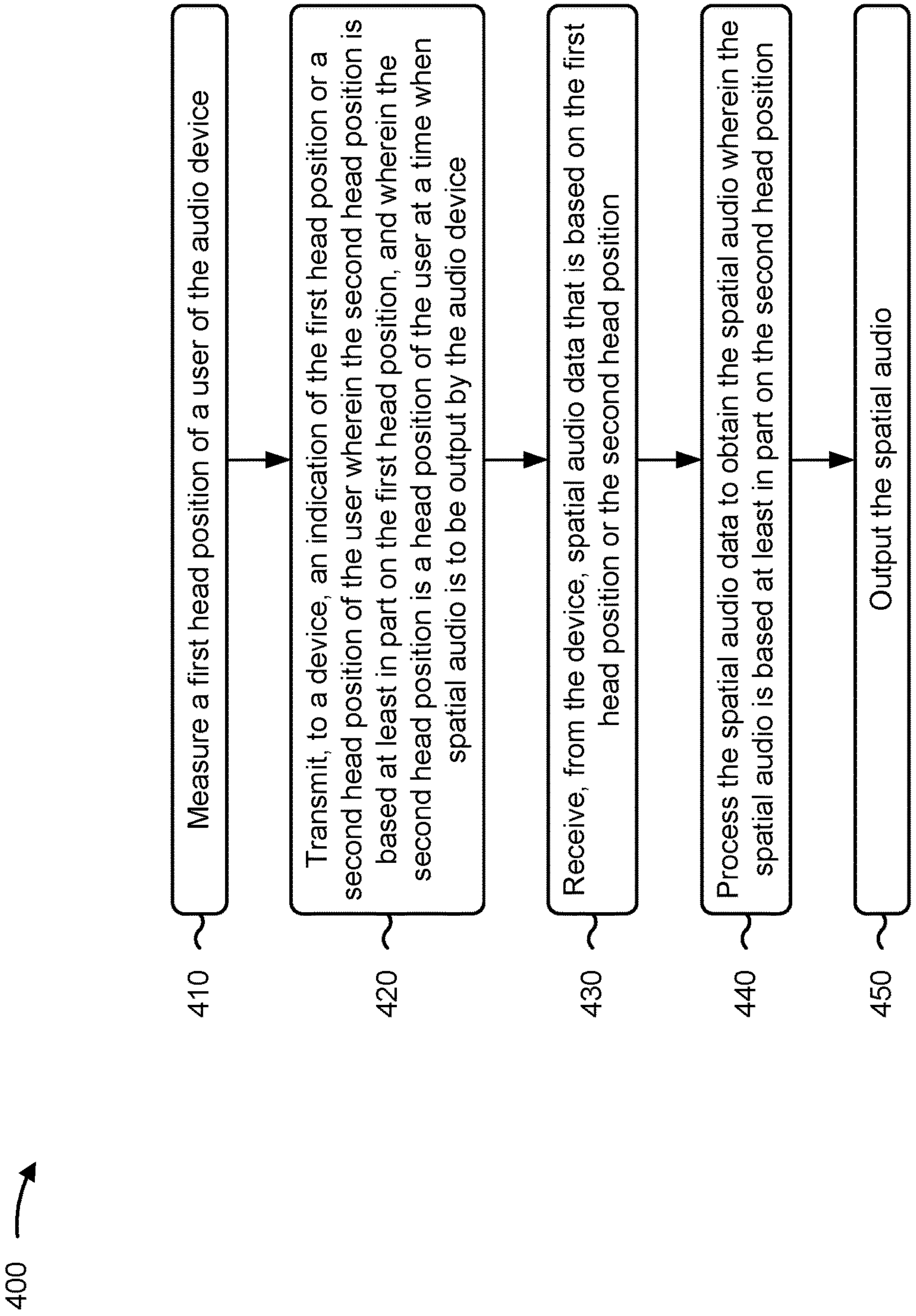
FIG. 4 is a flowchart of an example process associated with spatial audio adjustments for an audio device, in accordance with the present disclosure.

FIG. 4 is a flowchart of an example process 400 associated with spatial audio adjustments for an audio device. In some implementations, one or more process blocks of FIG. 4 are performed by an audio device (e.g., audio device 110). In some implementations, one or more process blocks of FIG. 4 may be performed by another device or a group of devices separate from or including the audio device, such as the user device 125, the head position tracker 115, the audio rendering component 120, and/or the audio processor 130. Additionally, or alternatively, one or more process blocks of FIG. 4 may be performed by one or more components of device 200, such as processor 210, memory 215, storage component 220, input component 225, output component 230, communication interface 235, sensor(s) 240, and/or speaker(s) 245.

As shown in FIG. 4, process 400 may include measuring a first head position of a user of the audio device (block 410). For example, the audio device may measure a first head position of a user of the audio device, as described above.

As further shown in FIG. 4, process 400 may include transmitting, to a device, an indication of the first head position or a second head position of the user, wherein the second head position is based at least in part on the first head position, and wherein the second head position is a head position of the user at a time when spatial audio is to be output by the audio device (block 420). For example, the audio device may transmit, to a device, an indication of the first head position or a second head position of the user, wherein the second head position is based at least in part on the first head position, and wherein the second head position is a head position of the user at a time when spatial audio is to be output by the audio device, as described above. In some aspects, the second head position is based at least in part on the first head position. In some aspects, the second head position is a head position of the user at a time when spatial audio is to be output by the audio device. In some aspects, the second head position may be the second head position (e.g., the predicted head position) or the third head position as described above in connection with FIGS. 3A and 3B.

As further shown in FIG. 4, process 400 may include receiving, from the device, spatial audio data that is based on the first head position or the second head position (block 430). For example, the audio device may receive, from the device, spatial audio data that is based on the first head position or the second head position, as described above.

As further shown in FIG. 4, process 400 may include processing the spatial audio data to obtain the spatial audio, wherein the spatial audio is based at least in part on the second head position (block 440). For example, the audio device may process the spatial audio data to obtain the spatial audio, as described above. In some aspects, the spatial audio is based at least in part on the second head position.

As further shown in FIG. 4, process 400 may include outputting the spatial audio (block 450). For example, the audio device may output the spatial audio, as described above.

Process 400 may include additional implementations, such as any single implementation or any combination of implementations described below and/or in connection with one or more other processes described elsewhere herein.

In a first implementation, the first head position is a head position of the user at a first time, wherein the second head position is a head position of the user at a second time, and wherein a difference between the first time and the second time is based at least in part on at least one of communication delays or processing delays associated with outputting the spatial audio.

In a second implementation, alone or in combination with the first implementation, the second head position is a predicted head position of the user at the time when the spatial audio is to be output, the method further comprising determining the predicted head position of the user based at least in part on the first head position and based at least in part on historical head position measurements.

In a third implementation, alone or in combination with one or more of the first and second implementations, transmitting the indication of the first head position or the second head position of the user comprises transmitting, to the device, an indication of the predicted head position, and wherein the spatial audio data is based at least in part on the predicted head position.

In a fourth implementation, alone or in combination with one or more of the first through third implementations, determining the predicted head position comprises determining the predicted head position using a machine learning model or a prediction filter.

In a fifth implementation, alone or in combination with one or more of the first through fourth implementations, transmitting the indication of the first head position or the second head position of the user comprises transmitting, to the device, an indication of the first head position, and wherein the spatial audio data is based at least in part on the first head position, and wherein processing the spatial audio data comprises processing the spatial audio data, that is based at least in part on the first head position, to obtain the spatial audio that is based at least in part on the second head position.

In a sixth implementation, alone or in combination with one or more of the first through fifth implementations, process 400 includes measuring the second head position after receiving the spatial audio data.

In a seventh implementation, alone or in combination with one or more of the first through sixth implementations, the spatial audio data is first spatial audio data, and wherein processing the spatial audio data comprises processing the first spatial audio data to obtain second spatial audio data, wherein the second spatial audio data is based at least in part on the second head position.

In an eighth implementation, alone or in combination with one or more of the first through seventh implementations, the second head position is a predicted head position of the user at the time when the spatial audio is to be output, wherein the spatial audio data is based at least in part on the predicted head position, and the method further comprising determining an error value associated with the predicted head position based at least in part on a third head position, determining that the error value satisfies a threshold, and wherein processing the spatial audio data comprises processing, based at least in part on the error value satisfying the threshold, the spatial audio data to obtain the spatial audio that is based at least in part on the third head position.

In a ninth implementation, alone or in combination with one or more of the first through eighth implementations, process 400 includes measuring the third head position after receiving the spatial audio data.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A method performed by an audio device, comprising: measuring a first head position of a user of the audio device; transmitting, to a device, an indication of the first head position or a second head position of the user, wherein the second head position is based at least in part on the first head position, and wherein the second head position is a head position of the user at a time when spatial audio is to be output by the audio device; receiving, from the device, spatial audio data that is based on the first head position or the second head position; processing the spatial audio data to obtain the spatial audio, wherein the spatial audio is based at least in part on the second head position; and outputting the spatial audio.

Aspect 2: The method of Aspect 1, wherein the first head position is a head position of the user at a first time, wherein the second head position is a head position of the user at a second time, and wherein a difference between the first time and the second time is based at least in part on at least one of communication delays or processing delays associated with outputting the spatial audio.

Aspect 3: The method of any of Aspects 1-2, wherein the second head position is a predicted head position of the user at the time when the spatial audio is to be output, the method further comprising: determining the predicted head position of the user based at least in part on the first head position and based at least in part on historical head position measurements.

Aspect 4: The method of Aspect 3, wherein transmitting the indication of the first head position or the second head position of the user comprises: transmitting, to the device, an indication of the predicted head position; and wherein the spatial audio data is based at least in part on the predicted head position.

Aspect 5: The method of any of Aspects 3-4, wherein determining the predicted head position comprises: determining the predicted head position using a machine learning model or a prediction filter.

Aspect 6: The method of any of Aspects 1-5, wherein transmitting the indication of the first head position or the second head position of the user comprises: transmitting, to the device, an indication of the first head position; and wherein the spatial audio data is based at least in part on the first head position; and wherein processing the spatial audio data comprises: processing the spatial audio data, that is based at least in part on the first head position, to obtain the spatial audio that is based at least in part on the second head position.

Aspect 7: The method of Aspect 6, further comprising: measuring the second head position after receiving the spatial audio data.

Aspect 8: The method of any of Aspects 6-7, wherein the spatial audio data is first spatial audio data, and wherein processing the spatial audio data comprises: processing the first spatial audio data to obtain second spatial audio data, wherein the second spatial audio data is based at least in part on the second head position.

Aspect 9: The method of any of Aspects 1-8, wherein the second head position is a predicted head position of the user at the time when the spatial audio is to be output, wherein the spatial audio data is based at least in part on the predicted head position, and the method further comprising: determining an error value associated with the predicted head position based at least in part on a third head position; determining that the error value satisfies a threshold; and wherein processing the spatial audio data comprises: processing, based at least in part on the error value satisfying the threshold, the spatial audio data to obtain the spatial audio that is based at least in part on the third head position.

Aspect 10: The method of Aspect 9, further comprising: measuring the third head position after receiving the spatial audio data.

Aspect 11: An apparatus at a device, comprising a processor; memory coupled with the processor; and instructions stored in the memory and executable by the processor to cause the apparatus to perform the method of one or more of Aspects 1-10.

Aspect 12: A device, comprising a memory and one or more processors coupled to the memory, the one or more processors configured to perform the method of one or more of Aspects 1-10.

Aspect 13: An apparatus, comprising at least one means for performing the method of one or more of Aspects 1-10.

Aspect 14: A non-transitory computer-readable medium storing code, the code comprising instructions executable by a processor to perform the method of one or more of Aspects 1-10.

Aspect 15: A non-transitory computer-readable medium storing a set of instructions, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An audio device, comprising:
- two or more speakers that are configured to output spatial audio;
- one or more sensors;
- a memory; and
- one or more processors, coupled to the memory, configured to cause the audio device to:
- measure, via the one or more sensors, a first head position of a user of the audio device;
- transmit, to a device, an indication of the first head position or a second head position of the user, wherein the second head position is based at least in part on the first head position and a predicted head position of the user at the time when the spatial audio is to be output by the two or more speakers, wherein the spatial audio data is based at least in part on the predicted head position;
- receive, from the device, spatial audio data that is based on the first head position or the second head position;
- determine an error value associated with the predicted head position based at least in part on a third head position;
- determine that the error value satisfies a threshold;
- process, based at least in part on the error value satisfying the threshold, the spatial audio data to obtain the spatial audio that is based at least in part on the third head position; and
- output, via the two or more speakers, the spatial audio.

2. The audio device of claim 1, wherein the first head position is a head position of the user at a first time,
- wherein the second head position is a head position of the user at a second time, and
- wherein a difference between the first time and the second time is based at least in part on at least one of communication delays or processing delays associated with outputting the spatial audio.

3. The audio device of claim 1, wherein the second head position is a predicted head position of the user at the time when the spatial audio is to be output, and
- wherein the one or more processors are further configured to cause the audio device to:
- determine the predicted head position of the user based at least in part on the first head position and based at least in part on historical head position measurements.

4. The audio device of claim 3, wherein the one or more processors, to cause the audio device to determine the predicted head position of the user, are configured to cause the audio device to:
- determine the predicted head position using a machine learning model or a prediction filter.

5. The audio device of claim 1, wherein the one or more processors, to cause the audio device to transmit the indication of the first head position or the second head position of the user, are configured to cause the audio device to:
- transmit, to the device, an indication of the first head position; and
- wherein the spatial audio data is based at least in part on the first head position; and
- wherein the one or more processors, to cause the audio device to process the spatial audio data, are configured to cause the audio device to:
- process the spatial audio data, that is based at least in part on the first head position, to obtain the spatial audio that is based at least in part on the second head position.

6. The audio device of claim 5, wherein the spatial audio data is first spatial audio data, and wherein the one or more processors, to cause the audio device to process the spatial audio data, are configured to cause the audio device to:
- process the first spatial audio data to obtain second spatial audio data, wherein the second spatial audio data is based at least in part on the second head position.

7. A method performed by an audio device, comprising:
measuring a first head position of a user of the audio device;
transmitting, to a device, an indication of the first head position or a second head position of the user,
wherein the second head position is based at least in part on the first head position,
wherein the second head position is a head position of the user at a time when spatial audio is to be output by the audio device;
receiving, from the device, spatial audio data that is based on the first head position or the second head position;
processing the spatial audio data to obtain the spatial audio,
wherein the spatial audio is based at least in part on the second head position;
wherein the second head position is a predicted head position of the user at the time when the spatial audio is to be output, and the method further comprising:
determining an error value associated with the predicted head position based at least in part on a third head position;
determining that the error value satisfies a threshold;
wherein processing the spatial audio data comprises:
processing, based at least in part on the error value satisfying the threshold, the spatial audio data to obtain the spatial audio that is based at least in part on the third head position; and
outputting the spatial audio.

8. The method of claim 7, wherein the second head position is a predicted head position of the user at the time when the spatial audio is to be output, the method further comprising:
determining the predicted head position of the user based at least in part on the first head position and based at least in part on historical head position measurements.

9. The method of claim 7, wherein transmitting the indication of the first head position or the second head position of the user comprises:
transmitting, to the device, an indication of the first head position; and
wherein the spatial audio data is based at least in part on the first head position; and
wherein processing the spatial audio data comprises:
processing the spatial audio data, that is based at least in part on the first head position, to obtain the spatial audio that is based at least in part on the second head position.

10. The method of claim 9, further comprising:
measuring the second head position after receiving the spatial audio data.

11. A non-transitory computer-readable medium storing a set of instructions, the set of instructions comprising:
one or more instructions that, when executed by one or more processors of an audio device,
cause the audio device to:
measure a first head position of a user of the audio device;
transmit, to a device, an indication of the first head position or a second head position of the user,
wherein the second head position is based at least in part on the first head position, and
wherein the second head position is a head position of the user at a time when spatial audio is to be output by the audio device;
receive, from the device, spatial audio data that is based on the first head position or the second head position;
process the spatial audio data to obtain the spatial audio,
wherein the spatial audio is based at least in part on the second head position,
wherein the second head position is a predicted head position of the user at the time when the spatial audio is to be output;
determine an error value associated with the predicted head position based at least in part on a third head position;
determine that the error value satisfies a threshold;
wherein the one or more instructions, that cause the audio device to process the spatial audio data, cause the audio device to:
process, based at least in part on the error value satisfying the threshold, the spatial audio data to obtain the spatial audio that is based at least in part on the third head position; and
output the spatial audio.

12. The non-transitory computer-readable medium of claim 11, wherein the second head position is a predicted head position, and wherein the one or more instructions further cause the audio device to:
determine the predicted head position of the user based at least in part on the first head position and based at least in part on historical head position measurements.

13. The non-transitory computer-readable medium of claim 11, wherein the one or more instructions, that cause the audio device to transmit the indication of the first head position or the second head position of the user, cause the audio device to:
transmit, to the device, an indication of the first head position; and
wherein the spatial audio data is based at least in part on the first head position; and
wherein the one or more instructions, that cause the audio device to process the spatial audio data, cause the audio device to:
process the spatial audio data, that is based at least in part on the first head position, to obtain the spatial audio that is based at least in part on the second head position.

* * * * *